: 3,393,225
PREPARATION OF GLYCOL DICARBOXYLATES
Donald M. Fenton, Anaheim, Calif., assignor to Union Oil Company of California, Los Angeles, Calif., a corporation of California
No Drawing. Filed Jan. 11, 1965, Ser. No. 424,799
8 Claims. (Cl. 260—476)

ABSTRACT OF THE DISCLOSURE

The invention comprises the oxidation of olefins to glycol dicarboxylates by contacting the olefin with rhenium heptoxide in the presence of an acid anhydride of a carboxylic acid. The olefin is oxidized to the glycol ester of the carboxylic acid corresponding to the acid anhydride and this oxidation results in the reduction of a stoichiometric quantity of the rhenium heptoxide to a lower oxidation state. The reduced rhenium compound can be reoxidized by contact with oxygen. A specific example is the oxidation of ethylene to ethylene glycol diacetate by contacting with acetic anhydride and rhenium heptoxide at 400 p.s.i.g. and 100° C.

DESCRIPTION OF THE INVENTION

This invention relates to the preparation of glycol dicarboxylates; and in particular, relates to the liquid phase preparation of glycol dicarboxylates in the presence of rhenium heptoxide.

I have discovered that acyclic hydrocarbon olefins and acid anhydrides react to form valuable dicarboxylates at an attractively high rate in the presence of rhenium heptoxide under relatively mild conditions, whereas in the absence of the rhenium heptoxide the reaction does not take place. Glycol dicarboxylates are useful as solvents and can be thermally cracked to form vinyl carboxylates such as vinyl acetate which are well known monomers.

In its simplest embodiment, my invention comprises contacting at a temperature of —20° to 200° C., acyclic hydrocarbon olefins having 2 to 30 carbon atoms and acid anhydrides having 2 to 40 carbon atoms with rhenium heptoxide in a liquid reaction medium at sufficient pressure to maintain the reaction medium as a liquid.

Olefins that can be used in my process are branched or straight chain unsaturated acyclic hydrocarbon olefins having one or more double bonds. Low molecular weight olefins that are gaseous at ambient temperature and pressure such as ethylene, propylene, 1-butene, 2-butene, etc., can be used as well as hydrocarbon olefins that are normally liquid at such conditions, such as 2-pentene, 2-propylhexene-1, 1-heptene, 4,4-dimethylnonene-1, 3-octene, 1-nonene, isodecylene, dodecene, 1-tetradecene, 3-propyldecene-1, heptadecene, 4-hexadecene, isooctadecene, docosene, tetracosene, hexacosene, octacosene, triacontene, eicosene, etc. In general, olefins containing from 2 to 30 carbon atoms can be used with the preferred range being from 2 to 20 carbon atoms and most preferred 2 to 10 carbon atoms. Relatively pure olefins can be reacted to simplify the product recovery steps; however, it is also within the scope of my invention to use olefin mixtures such as mixtures of normally gaseous hydrocarbons, normally liquid hydrocarbons, or normally gaseous and normally liquid hydrocarbons.

Acid anhydrides that may be used in my novel reaction are branched or straight chain acyclic or cyclic anhydrides. Examples of such acid anhydrides are acetic, propionic, butyric, valeric, caproic, caprylic, capric, lauric, myristic, palmitic, stearic, benzoic, toluic, phthalic, naphthoic, etc. In general, anhydrides of acids having 1 to 20 carbon atoms, and preferably, from about 2 to 10 carbon atoms can be used. Acid anhydride mixtures can also be used as well as anhydrides formed from acids having a dissimilar number of carbon atoms.

According to my process, olefins and acid anhydrides as described are reacted with rhenium heptoxide. Rhenium heptoxide can be produced by oxidizing rhenium metal and/or lower valence rhenium oxides such as rhenium trioxide, rhenium dioxide, etc., by contacting said rhenium and rhenium oxides with oxygen at temperatures from about 125° to 400° C., and preferably from about 150° to 300° C. Rhenium heptoxide can also be prepared by hydrolysis of rhenium salts such as alkali metal, alkaline earth metal and ammonium perrhenates, i.e., sodium perrhenate, potassium perrhenate, calcium perrhenate, ammonia perrhenate, etc., to perrhenic acid followed by a dehydration step.

During the reaction involved in my invention, the rhenium heptoxide is reduced to a lower oxidation state and must be regenerated so it can be used again in the reaction. This regeneration can be performed in a separate step by removing all or a portion of the reaction medium which contains the reduced rhenium from further contact with olefins and acid anhydrides and thereafter contacting it with oxygen. In situ regeneration can also be used by introducing oxygen into the reaction zone. However, this method of oxidation may result in spurious oxidation. In either event, the regeneration can be achieved at a suitable rate at temperatures from about 125° to 400° C.; preferably from about 150° to 300° C. Pressures from about 1 to about 250 atmospheres and preferably, pressures from about 200 to 2,000 p.s.i. can be used.

The reaction is performed in a liquid phase. When higher olefins or acid anhydrides are used as the reactants, i.e., those that are in liquid state under the reaction conditions, they can conveniently be used in excess thereby serving as a reaction medium. However, when normally gaseous olefins are reacted with acid anhydrides, the anhydrides may act as solvent or a liquid organic reaction medium can be used which is a solvent for the normally gaseous reactants. In general, any organic compound that is a liquid and which is chemically nonreactive with the olefins, acid anhydride and their reaction products at the reaction conditions can be used. Examples of suitable solvents are: aromatic hydrocarbons such as benzene, toluene, xylene, etc.; esters such as methyl acetate, ethyl acetate, dimethyl phthalate, ethyl propionate, n-propyl acetate, n-butyl formate, sec-butyl acetate, isobutyl acetate, ethyl butyrate, isoamyl acetate, cyclohexyl acetate, etc.; halogenated hydrocarbons such as chlorobenzene, bromobenzene, carbon tetrachloride, n-butyl bromide, iso-amyl bromide, iso-amyl chloride, tricholorpropane, pentachloroethane, ethyl chloride, ethyl bromide, isobutyl chloride, etc.; and saturated aliphatic hydrocarbons such as hexane, heptane, iso-octane, nonane, decane, cyclohexane, methyl cyclohexane, etc.

The temperature at which the reaction can be conducted is dependent upon the olefins and acid anhydride charging stock employed. However, the reaction is generally carried out at a temperature of about —20° to 200° C. and preferably at a temperature of about 20° to 100° C. Pressure aids the reaction if gaseous conditions are used. Generally pressures of about $10^{-2}$ to $10^{+3}$ atmospheres are used with the preferred range being 1 to 100 atmospheres.

The reaction can be performed in accordance with the method of my invention in a discontinuous batch or in a continuous process at the aforementioned temperature and pressure conditions. In the discontinuous process, olefins are introduced into a reaction vessel to contact a liquid reaction medium containing acid anhydride and rhenium heptoxide. The introduction of the olefin is continued until further olefin absorption or heat release ceases, indicating that the rhenium heptoxide has been substantially reduced to an inactive state. The reaction product can then be recovered by distillation and oxygen introduced into the reaction vessel to reoxidize the reduced rhenium. Complete regeneration is indicated by lack of further oxygen absorption or heat release. It is also within the scope of my invention to regenerate the reduced form of the rhenium in a second vessel. In this preferred manner, oxygen never contacts the reactants and the reaction products in the reaction vessel and accordingly eliminates spurious oxidation.

In a continuous method, the olefin and oxygen can be introduced into the reaction vessel simultaneously. The oxygen can also be admixed with an inert gas such as nitrogen, argon, carbon dioxide, etc., or air or mixtures of air and oxygen. It is preferred when using a continuous method, to operate at temperatures from about 150° to 200° C. so that regeneration of the reduced rhenium species will take place in the reaction vessel without changing the physical conditions of the system. As oxygen is introduced into the reaction vessel, the reactants can be stirred or mixed to assure complete oxygen contact with the rhenium compound in said vessel.

The following examples will illustrate the mode of practice of my invention and demonstrate the results obtainable thereby. All parts expressed herein are on a weight basis.

Example 1

A 300 milliliter titanium autoclave was charged with 100 parts acetic anhydride, 10 parts rhenium heptoxide. The autoclave was closed and pressured with ethylene to 400 p.s.i. The contents of the autoclave were heated to 100° C. and held at that temperature for 4 hours. During this time the reactants were continually stirred and the pressure was observed to decrease to a steady state of 325 p.s.i. The reactants were then cooled and reduced rhenium was filtered therefrom. The filtrate was analyzed by gas-liquid chromatography and found to contain 15 parts ethylene glycol diacetate.

Example 2

A 300 milliliter autoclave was charged with 8 parts rhenium heptoxide, 32 parts benzoic anhydride, 50 parts ethyl acetate, and ethylene to 400 p.s.i. The mixture was continually stirred and maintained at 100° C. for 4 hours whereupon it was cooled and determined by gas-liquid chromatography to contain 4 parts of ethylene glycol dibenzoate.

Example 3

A 300 milliliter autoclave was charged with 10 parts rhenium heptoxide, 100 parts acetic anhydride, 50 parts benzene and pressured with ethylene to 600 p.s.i. The mixture was heated to and maintained at 150° C. for 4 hours. Oxygen was slowly added to the autoclave in increments of 10 p.s.i. to maintain the autoclave pressure at about 600 p.s.i. The mixture was then cooled and determined by gas-liquid chromatography to contain 12 parts ethylene glycol diacetate.

Example 4

A 300 milliliter autoclave was charged with 10 parts rhenium heptoxide, 50 parts propionic anhydride and 50 parts 3-hexene. The contents of the autoclave were heated to and maintained at 100° C. for 4 hours during which time they were continually stirred. The reactants were then cooled and reduced rhenium was filtered therefrom. The filtrate was analyzed by gas-liquid chromatography and found to contain 10 parts 3,4-dipropionyloxyhexane.

The following examples are illustrative of a number of hydrocarbon olefins and acid anhydrides that can be reacted with rhenium heptoxide and of the resulting glycol dicarboxylate products produced from the reactions which fall within the scope of the invention.

TABLE

| Ex. No. | Olefin | Acid Anhydride | Glycol Dicarboxylate |
|---|---|---|---|
| 5 | 2-methyl-1-pentene | Acetic | 1,2-diacetoxy-2-methylpentane. |
| 6 | 1-nonene | Benzoic | 1,2-dibenzoyloxynonane. |
| 7 | 1,4-nonene | Stearic | 1,2,4,5-tetrastearyloxynonane. |
| 8 | 2-eicosene | Myristic | 2,3-dimyristyloxyeicosane. |
| 9 | Ethylene and 2-hexene. | Capric | 1,2-dicapryloxyethane and 2,3-dicapryloxyhexane. |
| 10 | Propylene | Caproic | 1,2-dicaproyloxypropane. |
| 11 | 4-hexadecene | Butyric | 4,5-dibutyryloxyhexadecane. |
| 12 | 4-propyl-1-decene | Propionic | 1,2-dipropionyloxy-4-propyldecane. |

The preceding examples are intended solely to illustrate the practice of my invention and to demonstrate results secured thereby. These examples are not intended to unduly limit the invention which is intended to be defined only by the steps and reagents, and their obvious equivalents, set forth in the following claims.

I claim:

1. A method for the preparation of glycol dicarboxylates which comprises contacting, at a temperature of −20° to 200° C., acyclic hydrocarbon olefins having 2 to 20 carbon atoms and anhydrides of hydrocarbon carboxylic acids having 1 to 20 carbon atoms with rhenium heptoxide in a liquid organic reaction medium at a pressure from 0.01 to 1000 atmospheres and sufficient to maintain said reaction medium as a liquid.

2. The method of claim 1 wherein the hydrocarbon olefin is ethylene.

3. The method of claim 1 wherein the acid anhydride is acetic anhydride.

4. The method of claim 1 wherein the liquid reaction medium is an aromatic hydrocarbon.

5. A method for the preparation of glycol dicarboxylates which comprises contacting, at a temperature of 125° to 200° C. and in the presence of oxygen acyclic hydrocarbon olefins having 2 to 10 carbon atoms and anhydrides of hydrocarbon carboxylic acids having 2 to 10 carbon atoms with rhenium heptoxide in a liquid organic reaction medium at pressure from 1 to 100 atmospheres and sufficient to maintain said medium as a liquid.

6. The method of claim 5 wherein the liquid reaction medium is benzene.

7. The method of claim 6 wherein the olefin is ethylene.

8. The method of claim 7 wherein the acid anhydride is benzoic anhydride.

No references cited.

LORRAINE A. WEINBERGER, *Primary Examiner.*

T. L. GALLOWAY, *Assistant Examiner.*